United States Patent
Wilson

(10) Patent No.: US 8,332,289 B2
(45) Date of Patent: *Dec. 11, 2012

(54) SPENDING VEHICLES FOR PAYMENTS

(75) Inventor: Robert D. Wilson, Shawnee, KS (US)

(73) Assignee: H&R Block Tax Services LLC, Kansas City, MO (US)

( * ) Notice: Subject to any disclaimer, the term of this patent is extended or adjusted under 35 U.S.C. 154(b) by 10 days.

This patent is subject to a terminal disclaimer.

(21) Appl. No.: 12/710,169

(22) Filed: Feb. 22, 2010

(65) Prior Publication Data

US 2010/0145849 A1  Jun. 10, 2010

Related U.S. Application Data

(63) Continuation of application No. 11/423,824, filed on Jun. 13, 2006, now Pat. No. 7,668,764, which is a continuation of application No. 09/483,537, filed on Jan. 14, 2000, now Pat. No. 7,072,862, and a continuation-in-part of application No. 09/354,870, filed on Jul. 16, 1999, now Pat. No. 7,177,829.

(51) Int. Cl.
*G06F 17/22* (2006.01)
*G07F 19/00* (2006.01)
*G06Q 40/00* (2006.01)

(52) U.S. Cl. .......................... 705/31; 705/35

(58) Field of Classification Search .................... 705/35, 705/36 R, 36 T, 39, 40, 14.1; 235/379
See application file for complete search history.

(56) References Cited

U.S. PATENT DOCUMENTS

| 3,596,256 A | 7/1971 | Alpert |
| 5,420,926 A * | 5/1995 | Low et al. ................. 705/74 |
| 5,724,523 A | 3/1998 | Longfield |
| 5,745,706 A * | 4/1998 | Wolfberg et al. ........... 705/35 |
| 5,787,405 A | 7/1998 | Gregory |
| 5,926,800 A | 7/1999 | Baronowski et al. |
| 6,347,305 B1 | 2/2002 | Watkins |
| 6,546,373 B1 | 4/2003 | Cerra |

(Continued)

FOREIGN PATENT DOCUMENTS

WO  WO 98/04987  2/1998

(Continued)

OTHER PUBLICATIONS

KEMP, "Discover Debuts Its First Platinum card", DM News, Jan. 4, 1999, p. 2.*

(Continued)

*Primary Examiner* — Kelly Campen
(74) *Attorney, Agent, or Firm* — Hovey Williams LLP

(57) ABSTRACT

A system and method for associating payments with spending vehicles so that an individual who is entitled to receive periodic or special payments, such as tax refunds or social security checks, receives in place of the payment a spending vehicle, such as a debit card, pre-paid credit, or other card having funds stored thereon. An individual who wishes to receive a spending vehicle rather than the regular payment selects the spending vehicle he or she would like to receive. The individual then assigns his or her right to receive the payment to a third party. The third party then arranges to give a spending vehicle to the individual and to transfer the individual's payment to a sponsor of the spending vehicle. The third party may take a portion of the payment as compensation for the service.

20 Claims, 5 Drawing Sheets

U.S. PATENT DOCUMENTS

| | | | |
|---|---|---|---|
| 6,625,582 B2 | 9/2003 | Richman et al. | |
| 6,829,588 B1 | 12/2004 | Stoutenburg et al. | |
| 7,010,507 B1* | 3/2006 | Anderson et al. | 705/31 |
| 7,072,862 B1* | 7/2006 | Wilson | 705/31 |
| 7,127,425 B1* | 10/2006 | Wilson | 705/38 |
| 7,177,829 B1* | 2/2007 | Wilson et al. | 705/31 |
| 2007/0050277 A1* | 3/2007 | Wilson | 705/35 |
| 2007/0136160 A1* | 6/2007 | Wilson et al. | 705/31 |

FOREIGN PATENT DOCUMENTS

| | | |
|---|---|---|
| WO | WO 00/22494 | 4/2000 |
| WO | WO 00/42583 | 7/2000 |
| WO | WO 01/15031 | 3/2001 |
| WO | WO 01/39077 | 5/2001 |

OTHER PUBLICATIONS

"Dicover's Platinum May Stand Out in the Platinum Crowd", Credit Card News, Jan. 15, 1999.*

Beverly, Sondra G., Dailey, Colleen, Using Tax Refunds to Promote Asset Building in Low-Income Households: Program and Policy Options, Policy Report, Oct. 2003, Center for Social Development George Warren Brown School of Social Work, Washington University, St. Louis, MO.

Carbiz.com Acquires Tax Max Service Group, Inc., Apr. 25, 2000; www/theautochannel.com/news/press/date/20000425/press013905.html.

Prepare Now for EBT and Keep Serving Your Customers, Western Union Financial Services, Inc., 1998.

Bengtson, Tom, W. Union reaches the unbanked with "quick cash", Northwestern Financial Review, Jun. 27, 1998.

Texas Capital Bank Launches New Payroll Platform; Western Union Cash Card to Provide a More Efficient Payroll Alternative for Texas Businesses., Business Wire, Nov. 12, 1999.

Stegman, M., Lobenhofer, J., Quinterno, J., The State of Electronic Benefit Transfer (EBT), Center for Community Capitalism: Chapel Hill, NC, Dec. 2003.

Pirog, Maureen; Johnson, Craig, Kioko, Sharon, Jezewski, Laura, The Expanding Role & Efficacy of E-Government Innovations in US Social Services; prepared for VIII International Scientific Conference, "Modernization of Economic and Social Development," sponsored by the Higher School of Economics, Moscow, Russia, Apr. 2007.

Barr, Michael S., Banking the Poor, University of Michigan Law School, The John M. Olin Center for Law & Economics Working Paper Series, Year 2004, Paper 49.

EBT/EFT Update (1998), http://www.consumer-action.org/news/articles/ebt_eft_update_1998/.

Carbiz Acquires Tax Max Service Group Inc., The Canadian Venture Exchange, 2000.

1040 Tax Prep Update, Faulkner & Gray, Inc., Feb. 1995.

Sweepstakes and Free Refund Estimation Highlight Secure Tax Incentives; Business Wire, Jan. 13, 1998.

AM-Tax Professional 1040; Accounting Technology, Oct. 1998.

Demery, Paul, Tax Planning Draws a Crowd. Tax software vendors compete in what was once a one-horse race., Accounting Technology, Dec. 1998.

Tax Refund Services; Car Dealerships, http://web.archive.org/web/200010417010123/www.taxrefundservices.com/cardealerships.htm. 1997-200.

Tax Refund Services; How it Works; http://web.archive.org/web/20010419201055/www.taxrefundservices.com/howitworks.htm, 1997-2000.

Tax Refund Services, Tax Refund Services' Tax Marketing Agreement, Nos. 1-11, Tampa, FL, 2001.

Tax Refund Services; FAQ; http://web.archive.org/web/20010419200902/www.taxrefundservices.com/faq.htm, 1997-2000.

TRS Tax Marketing Program, Making It Easier to Buy a Car, Date Unknown.

Tax Refund Services, About Us, http://web.archive.org/web/20010418035210/www.taxrefundservices.com/aboutus.htm, 1997-2000.

Tax Refund Services, Tax Refund Services' Tax Marketing Agreement, Nos. 1-12, Tampa, FL, 2002.

In the United States District Court for the Eastern District of Texas Tyler Division; Civil Action No. 6:08-cv-37; *H&R Block Tax Services LLC*, v. *Jackson Hewitt Tax Service Inc.*, Amended Preliminary Invalidity Contentions of Defendant Jackson Hewitt Tax Service Inc.; dated Mar. 16, 2008.

Exhibit A to Amended Preliminary Invalidity Contentions of Defendant Jackson Hewitt Tax Service Inc.; dated Mar. 16, 2009; Preliminary Invalidity Contentions—U.S. Patent 7,072,862.

Exhibit AA to Amended Preliminary Invalidity Contentions of Defendant Jackson Hewitt Tax Service Inc.; dated Mar. 16, 2009; Preliminary Invalidity Contentions—U.S. Patent No. 7,127,425.

Exhibit B to Amended Preliminary Invalidity Contentions of Defendant Jackson Hewitt Tax Service Inc.; dated Mar. 16, 2009; Preliminary Invalidity Contentions—U.S. Patent No. 7,072,862.

Exhibit C to Amended Preliminary Invalidity Contentions of Defendant Jackson Hewitt Tax Service Inc.; dated Mar. 16, 2009; Preliminary Invalidity Contentions—U.S. Patent No. 7,072,862.

Exhibit D to Amended Preliminary Invalidity Contentions of Defendant Jackson Hewitt Tax Service Inc.; dated Mar. 16, 2009; Preliminary Invalidity Contentions—U.S. Patent No. 7,072,862.

Exhibit E to Amended Preliminary Invalidity Contentions of Defendant Jackson Hewitt Tax Service Inc.; dated Mar. 16, 2009; Preliminary Invalidity Contentions—U.S. Patent No. 7,072,862.

Exhibit F to Amended Preliminary Invalidity Contentions of Defendant Jackson Hewitt Tax Service Inc.; dated Mar. 16, 2009; Preliminary Invalidity Contentions—U.S. Patent No. 7,072,862.

Exhibit G to Amended Preliminary Invalidity Contentions of Defendant Jackson Hewitt Tax Service Inc.; dated Mar. 16, 2009; Preliminary Invalidity Contentions—U.S. Patent No. 7,072,862.

Exhibit H to Amended Preliminary Invalidity Contentions of Defendant Jackson Hewitt Tax Service Inc.; dated Mar. 16, 2009; Preliminary Invalidity Contentions—U.S. Patent No. 7,072,862.

Exhibit I to Amended Preliminary Invalidity Contentions of Defendant Jackson Hewitt Tax Service Inc.; dated Mar. 16, 2009; Preliminary Invalidity Contentions—U.S. Patent No. 7,072,862.

Exhibit J to Amended Preliminary Invalidity Contentions of Defendant Jackson Hewitt Tax Service Inc.; dated Mar. 16, 2009; Preliminary Invalidity Contentions—U.S. Patent No. 7,072,862.

Exhibit K to Amended Preliminary Invalidity Contentions of Defendant Jackson Hewitt Tax Service Inc.; dated Mar. 16, 2009; Preliminary Invalidity Contentions—U.S. Patent No. 7,072,862.

Exhibit L to Amended Preliminary Invalidity Contentions of Defendant Jackson Hewitt Tax Service Inc.; dated Mar. 16, 2009; Preliminary Invalidity Contentions—U.S. Patent No. 7,072,862.

Exhibit M to Amended Preliminary Invalidity Contentions of Defendant Jackson Hewitt Tax Service Inc.; dated Mar. 16, 2009; Preliminary Invalidity Contentions—U.S. Patent No. 7,072,862.

Exhibit N to Amended Preliminary Invalidity Contentions of Defendant Jackson Hewitt Tax Service Inc.; dated Mar. 16, 2009; Preliminary Invalidity Contentions—U.S. Patent No. 7,177,829.

Exhibit O to Amended Preliminary Invalidity Contentions of Defendant Jackson Hewitt Tax Service Inc.; dated Mar. 16, 2009; Preliminary Invalidity Contentions—U.S. Patent No. 7,177,829.

Exhibit P to Amended Preliminary Invalidity Contentions of Defendant Jackson Hewitt Tax Service Inc.; dated Mar. 16, 2009; Preliminary Invalidity Contentions—U.S. Patent No. 7,177,829.

Exhibit Q to Amended Preliminary Invalidity Contentions of Defendant Jackson Hewitt Tax Service Inc.; dated Mar. 16, 2009; Preliminary Invalidity Contentions—U.S. Patent No. 7,177,829.

Exhibit R to Amended Preliminary Invalidity Contentions of Defendant Jackson Hewitt Tax Service Inc.; dated Mar. 16, 2009; Preliminary Invalidity Contentions—U.S. Patent No. 7,177,829.

Exhibit S to Amended Preliminary Invalidity Contentions of Defendant Jackson Hewitt Tax Service Inc.; dated Mar. 16, 2009; Preliminary Invalidity Contentions—U.S. Patent No. 7,177,829.

Exhibit T to Amended Preliminary Invalidity Contentions of Defendant Jackson Hewitt Tax Service Inc.; dated Mar. 16, 2009; Preliminary Invalidity Contentions—U.S. Patent No. 7,177,829.

Exhibit U to Amended Preliminary Invalidity Contentions of Defendant Jackson Hewitt Tax Service Inc.; dated Mar. 16, 2009; Preliminary Invalidity Contentions—U.S. Patent No. 7,177,829.

Exhibit V to Amended Preliminary Invalidity Contentions of Defendant Jackson Hewitt Tax Service Inc.; dated Mar. 16, 2009; Preliminary Invalidity Contentions—U.S. Patent No. 7,177,829.
Exhibit W to Amended Preliminary Invalidity Contentions of Defendant Jackson Hewitt Tax Service Inc.; dated Mar. 16, 2009; Preliminary Invalidity Contentions—U.S. Patent No. 7,177,829.
Exhibit X to Amended Preliminary Invalidity Contentions of Defendant Jackson Hewitt Tax Service Inc.; dated Mar. 16, 2009; Preliminary Invalidity Contentions—U.S. Patent No. 7,177,829.
Exhibit Y to Amended Preliminary Invalidity Contentions of Defendant Jackson Hewitt Tax Service Inc.; dated Mar. 16, 2009; Preliminary Invalidity Contentions—U.S. Patent No. 7,177,829.
Exhibit Z to Amended Preliminary Invalidity Contentions of Defendant Jackson Hewitt Tax Service Inc.; dated Mar. 16, 2009; Preliminary Invalidity Contentions—U.S. Patent No. 7,127,425.
Form 20 F for Annual and Transition Reports Pursuant to Sections 13 or 15 (d) of the Securities Exchange Act of 1934, United States Securities and Exchange Commission Washington, DC 20549, Jan. 31, 2000.
Tax Max Auto Dealer Electronic Filing System; 2001/2002 Tax Season Reference Guide; Rev Sep. 26, 2001.
Government Computing/Dec. 1998; Bank Machine Benefits Offer.
Clolery, Paul, H&R Block Tests Mastercard; AICPA;s New Card Adds Benefits; The Practical Accountant; May 1993.
Goldsmith, Nigel, Blair's citizen card scheme; Government Computing/Nov. 1998.
PR Newswire, H&R Block Tests Low-Rate Credit Card in Select Markets; Mar. 4, 1993.
Business Wire; No. 1 Rated TaxCut Software for the 1999 Tax Year Ships to Retail Stores; Dec. 6, 1999.
UK Government scraps benefit payment project; Electronic Government International/Jun. 1999.
All for one-but not yet one for all; Local Government IT in Use; Mar./Apr. 1999.
Alexander, Antoinette; The Internet Rules Tax Filing Season; Accounting Technology; Jan./Feb. 2000; p. 52.
Brenner, Lynn; NY Thrift Promotes Tax Services Dollar Dry Dock Offers Refund in Advance of IRS Payment; American Banker (pre-1997 Fultext). New York, NY, Feb. 2, 1989; vol. 154, Iss. 23; p. 10.
Kennedy, Lenna D.; OASDI Beneficiaries and SSI Recipients With Representative Payees; Social Security Bulletin, Winter 1995; vol. 58, No. 4.
Meadows, Laura Lou; Electronic Filing Speeds Refunds; The New York Times; Mar. 5, 1989; Section 3; p. 27, col. 1.
Bondar, Joseph; Social Security Beneficiaries Enrolled in the Direct Deposit Program, Dec. 1996; Social Security Bulletin, vol. 61, No. 1, 1998.
Wales, Elspeth; Marriages of Convenience; Retail Systems, Sep. 1998; pp. 18-19.
Coulton, Antionette; National Bank Testing Visa Cash at Air Force Base; American Banker; New York, NY; Jul. 15, 1998, vol. 163, Iss. 133; p. 13.
Ferris, Nancy; Embracing Electronic Commerce; Government Executive; Jan. 1998; p. 49.
Slow roll out, and still thin on the ground; Government Computing; Jan. 1999.
Wade, Betsy; Practical Traveler; V.A.T. Refunds: Vexations Added; The New York Times; Oct. 11, 1998; Section 5, p. 4; col. 4.
Keenan, Charles; Citi to Issue Debit Cards Through Check Cashers; American Banker; Jan. 19, 1999; p. 18.
Employee Solutions Partners with Bank One; Plan for a Debit Card Announced; PR Newswire; New York, NY; Nov. 12, 1998; p. 1.
Debit Payoff; Card Fax; Nov. 13, 1998; vol. 1998, No. 233; p. 2.
United States: First Data NTS launches innovative debit card; Electronic Payments International; May 1997; p. 3.
Whiteman, Louis; New Company Targets Its Hybrid Debit Card to Unbanked Hispanics; Jan. 22, 1999; p. 6.
CSRG is First National User of NTS Debit Card for Remote and "Unbanked" Employees; PR Newswire; Aug. 15, 1997, Fort Worth, Texas.
Electronic tax filing: Fast track to fraud?; Bank Technology News; New York: Sep. 1995; vol. 8, Iss. 9; p. 6.

Kambil, Ajit, Short, James E.; Electronic integration and business network redesign: A roles-linkage perspective; Journal of Management Information Systems; Armonk: Spring 1994. vol. 10, Iss. 4; p. 59.
Brandel, Bill; Data Link Speeds Tax Filing, Refunds; Computerworld; Mar. 28, 1988; p. S7.
Purple, Bruce; Beneficial National Bank Launches in-Branch Tax Service for Quick Refund; Business Wire, New York; Jan. 16, 1992; Sec. 1; p. 1.
Rudnitsky, Howard; Tax Play; Forbes; New York, May 11, 1992, vol. 149, Iss. 10, p. 48.
Stetenfeld, Beth; The Power of Electronic Tax Filing; Credit Union Management; Oct. 1993; p. 32.
Brenner, Lynn; NY Thrift Promotes Tax Services Dollar Dry Dock Offers Refund in Advance of IRS Payment; American Banker (pre-1997 Fulltext); New York, NY; Feb. 2, 1989, vol. 154, Iss. 23, p. 10.
Cocheo, Steve; Beneficial parentage; American Bankers Association; ABA Banking Journal; Jul. 1997, p. 44.
Lewis, Taub; Is Electronic Filing for You?; Small Business Report; Jan. 1994; p. 63.
Lynch, Michael F.; The Age of Electronic Filing; Journal of Accountancy; Nov. 1993; p. 30.
Petersen, Jim; Get With the Program the IRS Elf; The National Public Accountant; Nov. 1993; p. 42.
Petersen, James F., Washington, Keith A.; Why Electronic Tax Filing is Hot; Journal of Accountancy; Oct. 1993, p. 68.
Palmer, Kelly; Local Firm Offers Instant Tax Returns; Springfield Business Journal; Jan. 22, 1990; Vil. 10, Iss. 27, p. 1.
Vadum, Matthew; Company Cashes in on Lottery Bonanzas; Central Business Journal; Harrisburg; Apr. 17, 1998, vol. 14, Iss. 16; p. 4.
Kremer, Victor; TheNews Weekly of Fixed Income and Credit Markets; Bondweek; Apr. 13, 1998; vol. XVIII, No. 15; p. 1.
Woodbridge Sterling Capital to Issue Securities Backed by Cash Flows from Lottery Winnings; PR Newswire; New York, Jul. 31, 1997.
Postel, Theodore; Lottery Prize: Assignment of Benefits; Chicago Daily Law Bulletin; Dec. 19, 1995; p. 1.
Checks and Electronic Payment, The Changing of the Checking Guard; Bank Technology News; Jan. 1999, p. 23.
Bank Systems and Technology, Mar. 1999; p. 10.
NaCCA Announces New Debit Card Program; Business Editors; Business Wire; New York, Jan. 11, 1999; p. 1.
Quinn, Jane Bryant; Separating Fact from Fiction on Federal Checks and Direct Deposit; The Washington Post; Jun. 6, 1999, p. H02.
Gellis, Harold C.; How to Get Plugged Into Electronic Tax Filing.
Delrio, Dey, Keeley, Chris; A Primer on Fringe Products Associated with RALs; Neighborhood Economic Development Advocacy Project; Nov. 2004.
Brown, Amy, et al.; Refund Loan Products and VITA: A Summary of Issues and Options; National Consumer Law Centers website www.nclc.org; Nov. 2004.
Hube, Karen; A Special Summary and Forecast of Federal and State Tax Developments; The Wall Street Journal; Dec. 29, 1999.
H&R Block to Enhance Tax, Financial Services; Down Jones New Service; Nov. 17, 1999.
Fund Anticipation Loans; Subcommittee on Consumer Credit and Insurance of the Committee on Banking, Finance and Urban Affairs House of Representatives; Apr. 14, 1994; Serial No. 103-132.
Johnston, David Cay; Beneficial sues over who gets IRS refunds; New York Times News Service; The Oregonian Publishing Company; Feb. 22, 1995.
Hogan, Mike; Draft! It's Tax Time Again; PC World Online; Dec. 17, 1999.
Artis, Joanne Ball, Globe Staff; Fees for speedy tax refunds decried for high interest rate Tax filing firm defends practice as a favor to consumer; The Boston Globe; Feb. 17, 1993.
Vanac, Mary; Florida Car Dealers Will Do Your Taxes, Let You Drive Home in Refund; Knight-Ridder Tribune Business News; Akron, Ohio, Beacon Journal; Mar. 5, 1999.
IRS Refund Glitch Sees Banks Stiffed; The Associated Press; Feb. 6, 1992.
O'Hara, Terrence; Santa Barbara Bank Decides to Rethink its Refund Anticipation Loan Business; American Banker; Jun. 23, 1995; p. 6.

Jackson, Kelly; Transmit it to the IRS; Communications Week; CMP Publications; Apr. 2, 1990; Issue 294; p. 8.
USDA—Food and Nutrition Service; Food Stamp Electronic Benefit Transfer Systems; A Report to Congress; Oct. 2003.
Brown, Jim; Ways to Pay; Network World, Aug. 29, 1988; p. 29.
Kutler, Jeffrey, TV Expedites Validation of Visa Charges; American Banker; New York, NY; Jul. 20, 1988; vol. 153, Iss. 140, p. 1.
Finch, Paul, Haynes, Ray; Research Isolates Deposit Gains From EFT Technology; Mar. 1988, p. 58.
Kutler; Jeffrey; Chevron to Take Debit Cards by '92 at Service Stations; New York, NY, Sep. 7, 1988; vol. 153, Iss. 174, p. 2.
Bronstein, Scott, A Check-Writing Nation Ignores the Debit Card; The New York Times; Oct. 6, 1985; Section 3, p. 12.
Bank Card Report: POS: is the future now?; American Bankers Association. ABA Banking Journal, New York: Sep. 1986, vol. 78, Iss. 9, p. 66.
Courter, Eileen; Debit Cards Come of Age; Credit Union Management, Feb. 1996; p. 36.
Marjanovic, Steven; Ariz. Clearing House Chief Eyes Expansion Series: 15; American Banker; New York, NY Aug. 18, 1995, vol. 160, Iss. 159. p. 16.
Kutler, Jeffrey, Explore-Cactus Deal is Crowning Glory for Pioneer in Electronic Funds Transfer; American Banker, New York, NY, Mar. 11, 1994, vol. 159, Iss. 48, p. 15.
Barthel, Matt, Star's Explore Unit Merging with Cactus POS Network Series 2; American Banker, New York, NY, Mar. 11, 1994, vol. 159, Iss. 48, p. 1.
Bayot, Jennifer; Personal Bsuiness; for Some Taxpayers, the Refund is in the Plastic, Feb. 1, 2004.
State Recognition of Paycards; American Payroll Association; Feb. 2008.
Myers, Ware; On Trial at the Summer Olympic Games: Smart Cards; IEEE Computer Society, Jul. 1996, vol. 29, No. 7) pp. 88-91.
Lewis, Diane E., Globe Staff, It's all in the card. For some employees, paper is giving way to plastic on payday. The Boston Globe; Feb. 15, 2004.
Barish, William, Payroll Cards: How and Why to Make Them Work for Your Organization; Web April Paytech 2002; p. 16.
Johnston, David Cay, Company News; Bank Challenges I.R.S. on Refunds for Borrowers; The New York Times, Feb. 22, 1995.
Meyer, Gene, H&R Block Joins IRS Program That may Trim Cost of Quick Refunds, Kansas City Star, Nov. 18, 1999.
Mullaney, Timothy J., IRS fraud watch cuts refund loans, The Baltimore Sun Company, The Sun, Mar. 12, 1995.
Scott, Robert M., E-filing vendors outraged over death of DDI (electronic tax returns, direct deposit indicator), Accounting Today, Nov. 21, 1994.
Quinn, Jane Bryant, Borrowing is expensive way to get tax refund money fast, The Baltimore Sun Company, The Baltimore Sun, Feb. 23, 1998.
Meyer, Gene, Block joins IRS program to cut cost of fast refunds Debt Indicator also will be a tool in fighting fraud, Kansas City Star Co., Nov. 18, 1999.
Kraus, James R., Beneficial's tax-refund lending program seen on course after pullout from earned income sid, The American Baker, Inc., Mar. 8, 1995.
Excerpt from 10-Q SEC Filing, filed by Pacific Capital Bancorp/CA/ on May 17, 1999.
Jacob, Katy, Stored value cards: a scan of current trends and future opportunities, The Center for Financial Services Innovation, Research Series White Paper #1, Jul. 2004.
Cheney, Julia S., Prepaid cards models: a study in diversity, Federal Reserve Bank of Philadelphia, Mar. 2005.
Jacob, Katy, Su, Sabrina, Rhine, Sherrie L.W., Tescher, Jennifer, Stored value cards: challenges and opportunities for reaching emerging markets; A working paper for the Federal Reserve Board 2005 Research Conference.
Cheney, Julia S., Payment Cards and the Unbanked: Prospects and Challenges, Conference Summary, Jul. 13-14, 2005.
Anguelov, Christoslav, Hilgert, Marianne A., Hogarth, Jeanne M., U.S. Consumers and Electronic Banking, 1995-2003, 2004.
A Summary of the Roundtable Discussion on Stored-Value Cards and Other Prepaid Products, The Federal Reserve Board, 2008.
VISA taps IFS for global Cash card pilots, IFS International, Inc., Troy, May 5, 1997.
*Beckett v. H&R Block, Inc.*, 1994 WL 698505 (N.D. Ill.).
*Decarlo Turner, Plaintiff v. Beneficial National Bank and Beneficial Tax Masters Inc., Defendants,* F. Supp. 2d 929, 260 F. Supp. 2d 680, 2001 WL 290402, Sep. 10, 2003.
Karger, Howard, America's Growing Fringe Economy, Dollars & Sense The Magazine of Economic Justice, Nov./Dec. 2006 issue.
Rhine, Sherrie L.W., Su, Sabrina, Osaki, Yazmin, Householder Response to the Earned Income Tax Credit: Path of Sustenance or Road to Asset Building, Date Unknown.
Rasumssen, Kristina, From Government's Coffers to our Wallets: Why Americans Need Choices in Tax Refund Delivery Services, NTU Issue Brief 163, Apr. 16, 2007.
Skillern, Peter; Rust, Adam, The High Cost of Refund Anticipation Loans in North Carolina, The Community Reinvestment Association of North Carolina, Jan. 25, 2007.
Marcial, Gene G., Watch Out, H&R Block, Business Week Online; Nov. 10, 1997.
Sample Business Contracts—Refund Anticipation Loan Participation Agreement—Block Financial, Posted Date: Unknown; Printed Date: Jun. 25, 2008.
The Role of the IRS in the Refund Anticipation Loan Industry, National Taxpayer Advocate's 2007 Objectives Report to Congress, vol. II, Jun. 30, 2006.
Cole, Shawn A., Thompson, John, Tufano, Peter, Where Does it Go? Spending by the Financially Constrained, Apr. 11, 2008.
Berube, Alan, Kim, Anne, Forman, Benjamin, Burns, Megan, The Price of Paying Taxes: How Tax Preparation and Refund Loan Fees Erode the Benefits of the EITC, Center of Urban and Metropolitan Policy the Bookings Institution and the Progressive Policy Institute; May 2002.

* cited by examiner

SPENDING VEHICLES FOR PAYMENTS

RELATED APPLICATIONS

This application is a continuation of U.S. patent application Ser. No. 11/423,824, filed Jun. 13, 2006, entitled "Spending Vehicles for Payments," and which issued Feb. 23, 2010, as U.S. Pat. No. 7,668,764 ("the '764 patent"). The '764 patent is a continuation of U.S. patent application Ser. No. 09/483,537, filed Jan. 14, 2000, entitled "Spending Vehicles for Payments," and which issued Jul. 4, 2006, as U.S. Pat. No. 7,072,862. The '764 patent is also a continuation-in-part of U.S. patent application Ser. No. 09/354,870, filed Jul. 16, 1999, entitled "Tax Refund System," and which issued Feb. 13, 2007, as U.S. Pat. No. 7,177,829. The earlier filed patent applications are hereby incorporated by reference in their entirety into the present application.

BACKGROUND AND SUMMARY OF THE INVENTION

The present invention relates generally to a system and method for distributing payments to individuals and, more particularly, to a system and method for allocating a portion or all of an individual's payment into a spending vehicle.

Participants in many government and corporate sponsored programs are entitled to regular or periodic payments. For example, in government sponsored welfare programs such as Aid to Dependent Children and retirement programs such as Social Security, beneficiaries may receive monthly payments. Individuals who make regular IRA contributions during their working years may receive monthly or yearly distributions during their retirement years. Employees who participate in their employers' retirement programs such as 401(K) plans, may also receive monthly or yearly distributions during their retirement years. Individuals who participate in other savings and investment plans may receive regular or periodic dividend payments.

Individuals who receive periodic or regular payments from various government and corporate plans or programs typically receive a check from the plan or program administrator. Alternatively, individuals may arrange for an electronic funds transfer ("EFT") payment. In either case, the individuals receive cash payments. Individuals are then free to use the cash as desired.

Although the cash payments provide individuals with flexibility in making purchases, the overall purchasing power available to the individuals is equivalent to the dollar amount of cash payment. Alternatives to cash payments could provide individuals with increased purchasing power. For example, if instead of receiving a cash payment, an individual had the option of receiving a coupon from a retailer for an amount greater than the value of the cash payment, the individual would receive the benefit of increased purchasing power. Therefore, there is a need for a system and method by which individuals may select among alternatives to receiving cash payments.

The present invention provides a system and method for associating payments with spending vehicles so that an individual who is entitled to receive regular or periodic payments (e.g., Social Security checks, 401(k) distributions, dividend payments, tax refunds, payroll checks or deposits, private payment arrangements, or any other source of payment(s)) may choose to receive in place of the payment a spending vehicle such as a credit card, debit card, e-wallet account, gift card, discount card, rebate, coupon for use with purchases of the sponsor's products or services, or anything of value to the payee which the payee agrees to accept in this form instead of receiving a regular payment by check or cash or by direct deposit. Sponsors may include companies and organizations interested in offering purchase incentives to their customers. For example, sponsors may be retailers, manufacturers, or service providers. An individual who wishes to receive a spending vehicle rather than the regular payment selects the spending vehicle he or she would like to receive and assigns his or her right to receive the payment to a third party. The third party assignee may be a sponsor offering a spending vehicle or it may be a financial institution that serves as intermediary between an individual and a sponsor. If a sponsor offers the spending vehicle, the sponsor arranges to give a spending vehicle to the individual in return for an assignment of the individual's right to payment. If the spending vehicle is offered by a financial institution, the financial institution then arranges to give a spending vehicle to the individual and to transfer all or a portion of the individual's payment to the sponsor of the spending vehicle. The financial institution may take a portion of the individual's payment as compensation for the service provided to the individual and the sponsor. Alternatively, the financial institution may offer its own spending vehicle or it may purchase spending vehicles from various sponsors so that only one payment for purchase of the spending vehicles is made.

In a preferred embodiment of the present invention, the dollar value of the spending vehicle received by an individual is greater than the dollar value of the cash payment the individual would have received. Consumers of the present invention therefore benefit by increasing their purchasing power. Alternatively, the dollar value of the spending vehicle may be equivalent to or less than the dollar value of the cash payment the individual would have received. In this embodiment of the present invention, consumers benefit from the convenience of receiving a spending vehicle for use with purchases at their preferred sponsors. Sponsors benefit from the present invention through increased customer bases and additional traffic. They further benefit from increased sales of their products and services. Payors who make payments available to individuals benefit from an increase in the use of electronic funds transfers and a reduction in the printing and mailing of checks to individuals.

The present invention will be described in greater detail hereinafter. The present invention is described in the form of preferred embodiments and is not to be limited to those preferred embodiments but instead shall be given the broadest scope of protection affordable under the law in view of the allowed claims.

BRIEF DESCRIPTION OF THE DRAWING FIGURES

DETAILED DESCRIPTION OF THE PREFERRED EMBODIMENTS

Figure 1:
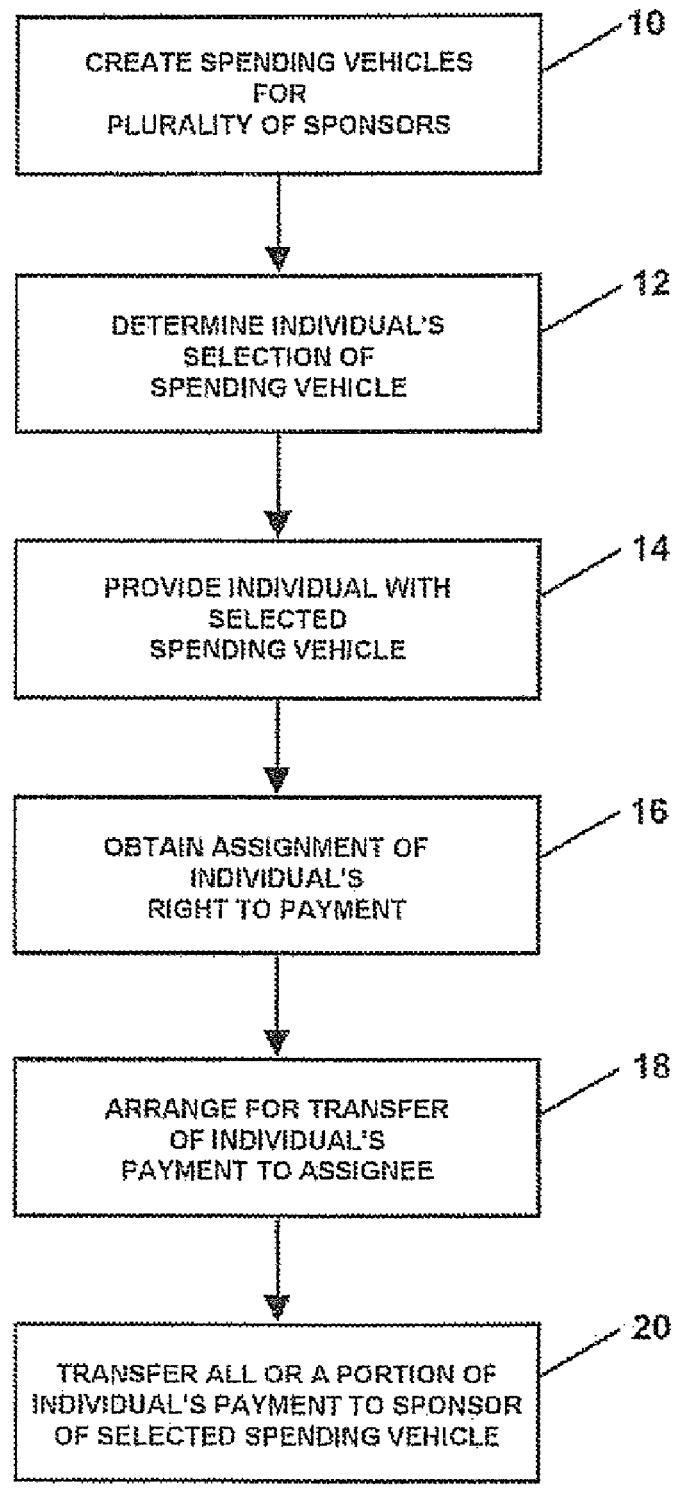
FIG. 1 is a flow diagram of a preferred embodiment of the present invention.

Referring now to the drawings, there is shown in FIG. 1 a flow diagram for a preferred embodiment of the system of the present invention. Steps to accomplish a preferred embodiment of the present invention are shown in FIG. 1. In the first step 10, a plurality of spending vehicles for a plurality of sponsors is created. A spending vehicle may be a credit card, debit card, cash card, checking card, spending account, checking account, e-wallet account, gift card, discount card, rebate, coupon, voucher or any other type of financial instrument or currency that enables the holder of the spending vehicle to purchase products or services. A sponsor may be a retailer, financial institution, service provider, wholesaler, distributor, manufacturer, entertainment entity, travel entity, publisher, governmental entity, insurance institution, brokerage institution, global computer network and online business, consortium of companies, or any participating entity through which an individual may purchase something of value to the individual. A sponsor participating in the system and method of the present invention may choose to offer one or more spending vehicles to its customers.

In the next step 12, the individual's selection of a spending vehicle is determined. The individual may be given the option of selecting more than one spending vehicle from one or more sponsors. Next 14, the individual is provided with the spending vehicle or vehicles selected. In exchange for the spending vehicle, the individual assigns his or her right to a payment to a third party in step 14. In one embodiment of the present invention, the individual assigns his or her right to payment directly to the sponsor who provided the spending vehicle. The individual may arrange to transfer the full amount or less than the full amount of the payment to the sponsor. The sponsor then provides one or more of its own spending vehicles to the individual with a value based on the amount of the payment assigned to the sponsor. In this embodiment, the sponsor provides a spending vehicle to the individual directly without the need of an intermediate entity such as a financial institution. The sponsor may be a financial institution. Alternatively, the individual may assign his or her right to payment to a financial institution. In this embodiment of the present invention, the financial institution may serve as an intermediary between a plurality of sponsors and an individual. The financial institution may then offer more types of spending vehicles from more sponsors thereby giving the individual more options than may be available from a single sponsor. Once the assignment is complete, the assignee of the individual's right to payment, (e.g., the sponsor or financial institution) arranges to receive the individual's payment in step 18. In step 20, if an intermediary such as a financial institution is the assignee of the right to payment, a portion or all of the payment may then be transferred to the sponsor or sponsors from whom the individual selected the spending vehicle. In order to accomplish the transfer of funds, a third party payor may arrange to transfer the individual's payment to a sponsor or financial institution entitled to receive the individual's payment based on the assignment.

Figure 2:
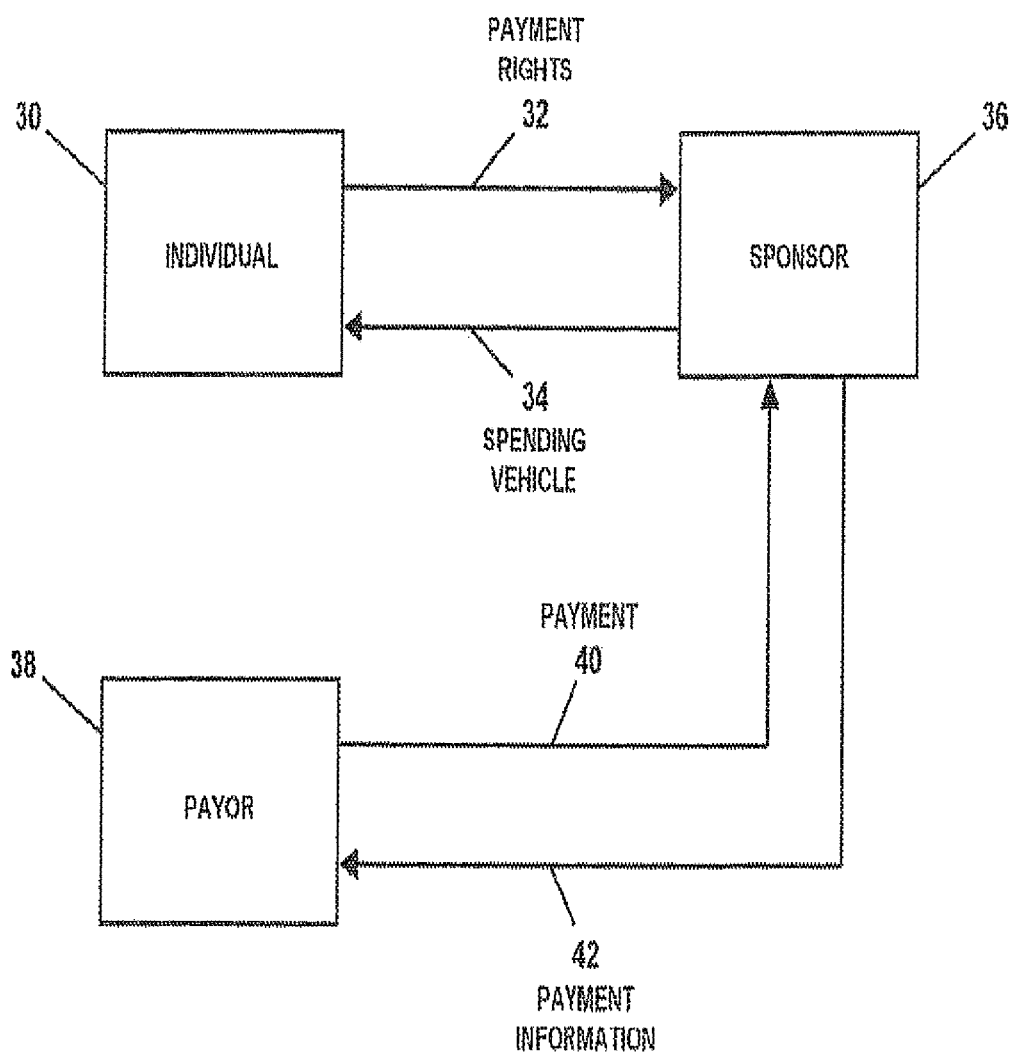
FIG. 2 is a schematic diagram of a first preferred embodiment of the present invention.

Referring to FIG. 2, an embodiment of the present invention in which an individual 30 obtains a spending vehicle 34 directly from a spending vehicle provider such as a sponsor 36 is shown. In exchange for the assignment of the payment rights 32 by the individual 30 to the sponsor 36, the spending vehicle provider or sponsor (i.e., third party assignee) provides a spending vehicle 34 to the individual 30. Information regarding the arrangement between the individual 30 and sponsor 36 may then be communicated with the third party payor from whom the individual is entitled to receive a payment. Payment information 42 such as name and account information may be transferred from the sponsor 36 to the third party payor 38 so that the sponsor 36 receives the individual's payment 40 directly. The payor may use electronic funds transfer to accomplish the transfer so that it is not required to process a check or other form of payment to the individual.

In accordance with the present invention, for example, an individual may assign his or her Social Security check to a retailer and in exchange for the right to receive the individual's check, the retailer provides the individual with a spending vehicle such as a credit card or debit card with a predetermined amount of spending power for use at various outlets. The retailer spending vehicle may include an amount of buying power greater than the amount of the Social Security check. For example, a retailer may issue a special debit card worth $500 in exchange for receiving the individual's check of $450. The benefit to the retailer is that the individual must spend his or her Social Security dollars at the retailer's store(s), and the benefit to the individual may be that the retailer offers buying power at the retailer's store(s) in excess of the dollar amount of the Social Security check.

Under a preferred embodiment of the present invention, the spending vehicle provider or sponsor may issue, for example, a debit card to an individual upon receiving confirmation of the receipt of the Social Security check. The credit card or debit card may not be activated until such time as the spending vehicle provider receives the funds for the check. The spending vehicle may include a telephone number for an individual to call to activate the spending vehicle once the spending vehicle provider is assured of receipt of payment. Once the individual's spending vehicle is activated, the individual may spend the value of the spending vehicle. For example, an individual who is entitled to receive a $450 Social Security check may assign that amount to a spending vehicle provider in exchange for $500 of spending power through a debit card good only at a particular retailer or at some group of retailers. In another example, an individual who is due an IRA distribution of $2,500 may assign his or her distribution amount to an automobile dealer in exchange for the automobile dealer issuing a spending vehicle worth $3,000 in buying power at the auto dealership. In another example, a cruise line may offer a spending vehicle of $3,000 in exchange for receiving the individual's distribution amount of $2,500.

The spending vehicle may take the form of many different embodiments, including but not limited to, credit cards, debit cards, cash cards, checking cards, spending accounts, checking accounts, electronic spending accounts, coupons, vouchers, discount certificates, rebate certificates, and any other vehicle in which an individual receives spending power in a particular dollar amount useable at practically any participating retailer, financial institution, service provider, wholesaler, distributor, manufacturer, entertainment entity, travel entity, publisher, governmental entity, insurance institution, brokerage institution, global computer network and online business, and any participating entity through which an individual may purchase something of value to the individual. A payment may be any type of regular or periodic payment such as a government, corporate, or employer benefit. It may also be a special one-time payment such as a tax refund or a special dividend payment from an investment.

Figure 3:
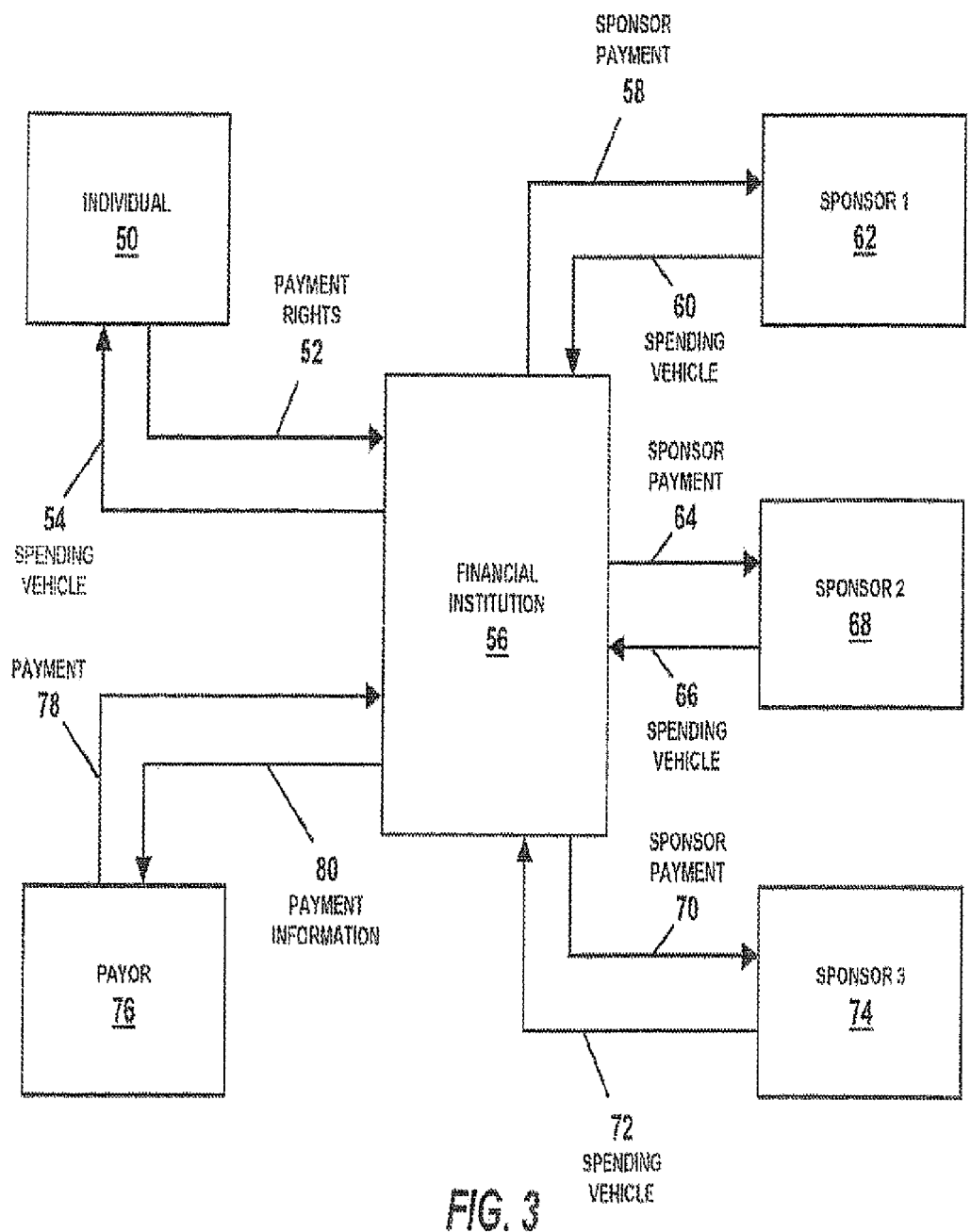
FIG. 3 is a schematic diagram of a second preferred embodiment of the present invention.

Referring to FIG. 3, use of a financial institution 56 as an intermediary or middleman between the individual 50, the payor 76 from whom the individual 50 is entitled to receive a payment, and the spending vehicle provider(s) or sponsor(s) 62, 68, 74 may be preferable. For example, financial institutions are typically well established in providing spending vehicles such as credit cards and debit cards. A retailer, for example, may find it helpful to provide its own spending vehicle if done in conjunction with a financial institution.

As shown in FIG. 3, a financial institution 56 may work with a plurality of sponsors 62, 68, 74 so that an individual 50 is provided with several options for selecting a spending vehicle. The financial institution 56 may arrange to obtain a plurality of spending vehicles 60, 66, 72 from a plurality of sponsors 62, 68, 74. As indicated above, the spending vehicles 60, 66, 72 may be credit cards, debit cards, cash cards, checking cards, spending accounts, checking accounts, electronic spending accounts, coupons, vouchers, discount certificates, or rebate certificates. The individual 50 assigns his or her payment rights 52 to a financial institution 56 and selects one or more spending vehicles 54 from one or more of the sponsors 62, 68, 74. The individual may assign the full or less the full amount of the payment to the financial institution. The financial institution may arrange to receive the appropriate amount of the individual's payment 78 by providing payment information 80 to the third party payor 76 from whom the individual is entitled to receive a payment. As indicated above, the payor 76 may be a governmental agency, an employer, or any institution that provides payments to individuals in accordance with instructions from a governmental agency, corporation, organization, employer, etc. The payment 78 may be a Social Security check, 401(k) distribution, dividend payment, tax refund, etc. The financial institution 56 may then arrange to transfer to each participating sponsor 62, 68, 74 all or a portion of the individual's payment 78. The financial institution 56 may keep a portion of each individual's payment as a fee for allowing sponsor participation. Preferably, the value of the spending vehicle 54 selected by the individual 50 exceeds the value of the payment right 52 transferred to the financial institution. In this arrangement, individuals benefit from the increased spending power available from the various sponsors. While financial institutions may be beneficial to the process of the present invention, they are not essential.

Figure 4:
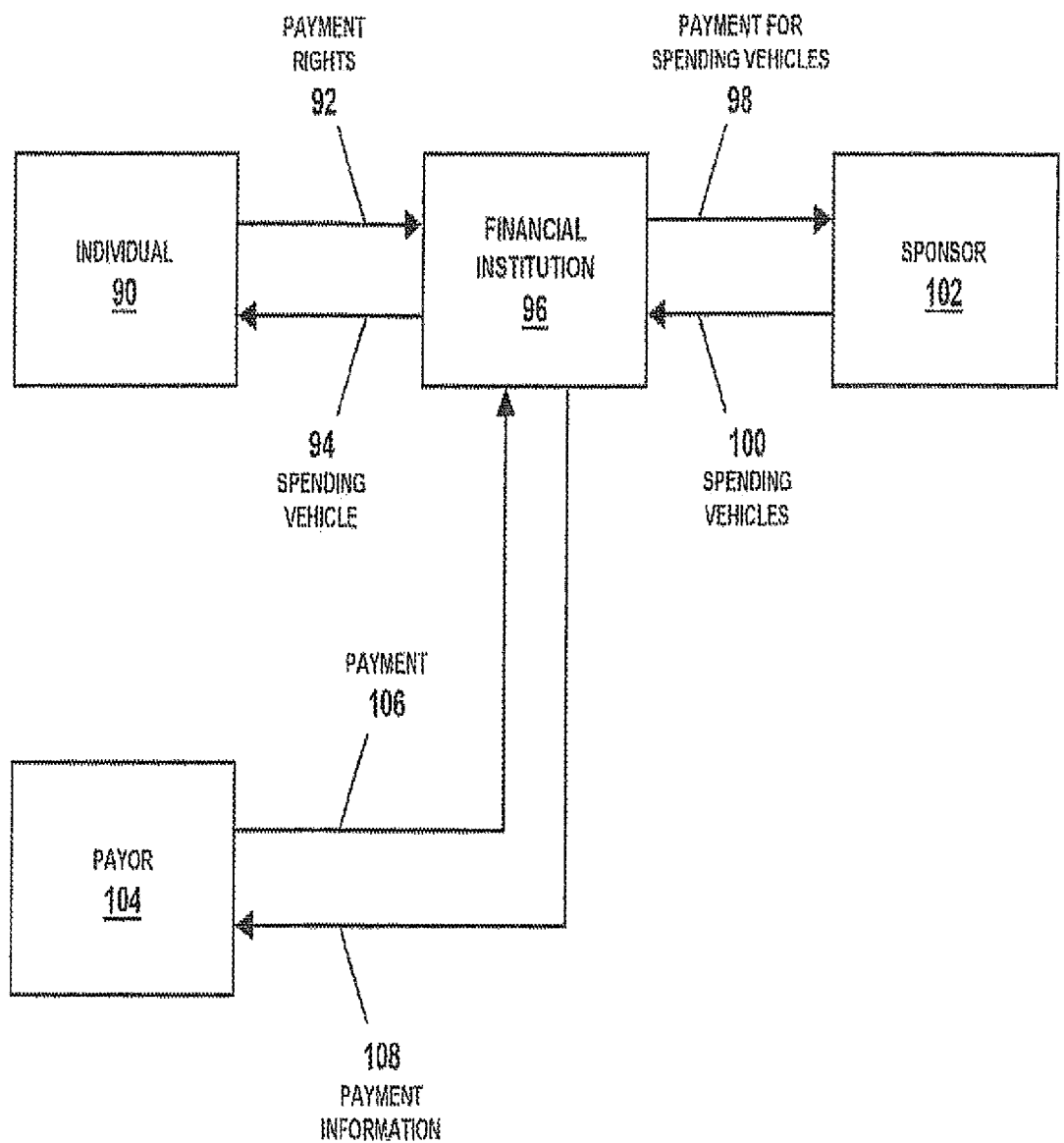
FIG. 4 is a schematic diagram of a third preferred embodiment of the present invention.

FIG. 4 shows another embodiment of the present invention in which a financial institution 96 purchases spending vehicles from a sponsor 102. In this embodiment of the present invention, a financial institution 96 may make a payment of a lump sum or fixed amount 98 to a sponsor 102 in return for a plurality of spending vehicles 100. The financial institution 96 may then distribute one of the spending vehicles 94 to an individual 90 in exchange for the right to receive a payment 92 from the individual or individual's payor 104. Payment information 108 provided by the financial institution 96 to the payor 104 may then be used to transfer the individual's payment 106 directly to the financial institution 96. An electronic funds transfer may be used to complete the transaction so the payor is relieved of the burden of processing a check payment to the individual.

In accordance with this embodiment of the present invention, a financial institution 96, for example, may purchase $5,000 worth of coupons for $4,000. The financial institution 96 may then sell the coupons to individuals for slightly less than the face value of each coupon but for more than it paid for each coupon. Under this arrangement, the sponsor benefits from the lump sum payment and increased sales due to the distribution of the coupons to potential customers while the financial institution benefits by selling the coupons for less than its purchase price. Individuals benefit from the increased spending power at the participating sponsor. In addition, the financial institution is not required to transfer any portion of the individual's payment to the sponsor.

Figure 5:
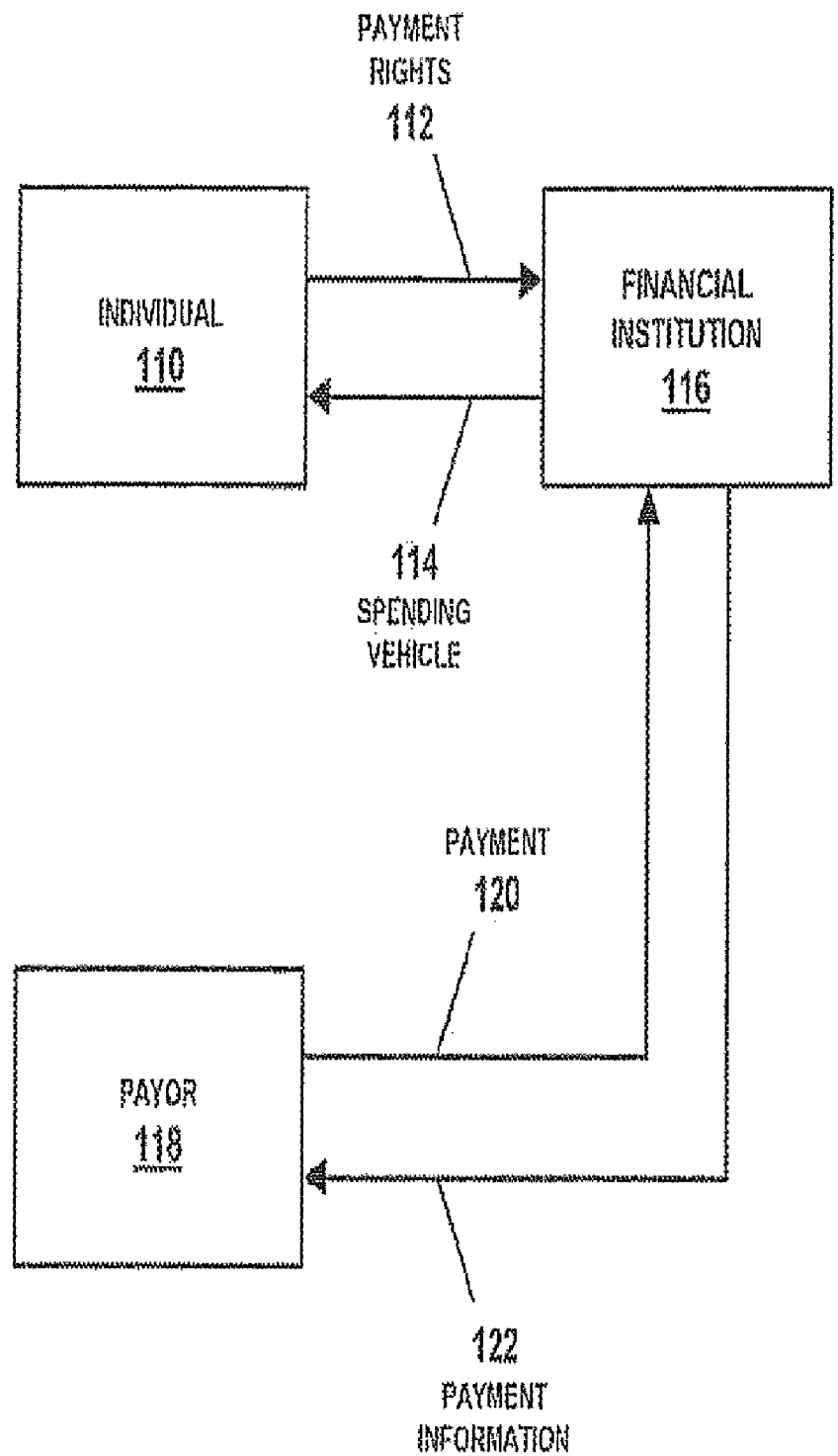
FIG. 5 is a schematic diagram of a fourth preferred embodiment of the present invention.

FIG. 5 shows another embodiment of the present invention in which a particular third party spending vehicle provider is not necessary. Instead, a financial institution 116 (perhaps the bank where the individual banks), for example, issues a spending vehicle 114 directly to the individual 110 that may be used at many different outlets for the purchase of goods and or services. In return for the spending vehicle 114, the individual 110 assigns payment rights 112, which may be any amount equal to or less than the amount of the payment, directly to the financial institution 116. The financial institution 116 receives the appropriate amount for the individual's payment 120 from the third party payor 118 after providing necessary payment information 122 to the payor 118. The payment information may include name and account information so that an electronic funds transfer may be completed.

Once the individual receives the spending vehicle and the individual has completed any process for activating the spending vehicle, the individual may spend the dollar amount of value inherent in that individual's spending vehicle through participating sponsor or sales outlets. Furthermore, the spending vehicle provider or sponsor may agree to assign its rights and obligations in the spending vehicle to another entity at which the individual may spend or obtain the unspent dollar amount of the spending vehicle. The individual is therefore given even greater flexibility in using the selected spending vehicle.

Once the spending vehicle is activated for the individual, in a preferred embodiment of the present invention, the individual may be given a period of time in which to use the spending vehicle before a service charge is applied. For example, the individual may incur no service charge on the spending vehicle if the spending vehicle is used within 90 days of being activated. In the event a minimum balance remains in the spending vehicle after the initial "no fee" period, a small monthly service charge may be levied against the spending vehicle until it is entirely used. Alternatively, after a period of time (e.g., 60 days) the spending vehicle provider may issue a check to the individual for the balance left in the spending vehicle. These alternatives provide the individual with greater flexibility in using the selected spending vehicle.

Having shown and described a preferred embodiment of the present invention, those skilled in the art will realize that many variations and modifications may be made to the described invention and still be within the scope of the claimed invention. Thus many of the elements indicated above may be altered or replaced by different elements which will provide the same or substantially the same result and fall within the spirit of the claimed invention. It is the intention therefore to limit the invention only as indicated by the scope of the claims.

The invention claimed is:

1. A method comprising the steps of:
   receiving information indicative of a tax refund payment payable by a payor to a payee;
   receiving information indicative of a selection by the payee to associate at least a portion of the tax refund payment with a spending vehicle;
   receiving information indicative of an assignment of right from the payee entitling a third-party payor to retain at least a portion of the associated tax refund payment;
   determining, via a computer, a load amount to be loaded on to the spending vehicle, with the load amount based on the portion of the tax refund payment assigned to the third-party payor;
   causing, via the computer, the spending vehicle to be loaded with the load amount; and
   receiving from the payor information indicative of payment of the associated tax refund payment.

2. The method of claim 1, further including the steps of—
presenting to the payee a plurality of types of spending vehicles, and
requesting the payee to select from the plurality of types of spending vehicles said spending vehicle on which to load the funds.

3. The method of claim 1, wherein upon loading, the funds are immediately accessible by the payee.

4. The method of claim 3, wherein the loading of the funds on the spending vehicle is not subject to a loan agreement pursuant to regulatory banking laws between the payee and the third-party payor.

5. The method of claim 3, wherein said assignment of right entitles the third-party payor rather than the payee to receive the retained portion of the associated tax refund payment in exchange for issuing said spending vehicle.

6. The method of claim 3, wherein the spending vehicle is a pre-paid credit card.

7. The method of claim 3, wherein the spending vehicle is a debit card.

8. The method of claim 1, wherein the payor is the Internal Revenue Service.

9. The method of claim 1, wherein the payor is a state taxing authority.

10. The method of claim 1, wherein the third-party payor is a financial institution.

11. The method of claim 1, wherein the third-party payor is a tax preparer.

12. The method of claim 1, wherein the associated tax refund payment is received from the payor via an electronic transfer.

13. A non-transitory computer readable storage medium with an executable program stored thereon for associating payments with spending vehicles, wherein the program instructs the processor to perform the following steps:
receiving information indicative of a tax refund payment payable by a payor to a payee;
receiving information indicative of a selection by the payee to associate at least a portion of the tax refund payment with a spending vehicle;
receiving information indicative of an agreement from the payee to receive funds loaded on the spending vehicle in exchange for a third-party payor receiving the associated tax refund payment;
upon receipt of said information indicative of an agreement from the payee, notifying the payor to deposit the associated tax refund payment in an account other than an account held by the payee or an account associated with the spending vehicle;
determining a load amount to be loaded on to the spending vehicle, with the load amount based on the portion of the tax refund payment assigned to the third-party payor;
causing the spending vehicle to be loaded with funds representing the associated tax refund payment; and
receiving from the payor information indicative of payment of the associated tax refund payment.

14. The computer readable storage medium of claim 13, wherein the agreement from the payee is associated with an assignment by the payee of its right to receive the associated tax refund payment from the payor.

15. The computer readable storage medium of claim 13, further including the steps of—
presenting to the payee a plurality of types of spending vehicles, and
requesting the payee to select from the plurality of types of spending vehicles said spending vehicle on which to load the funds.

16. The computer readable storage medium of claim 13, wherein upon loading, the funds are immediately accessible by the payee.

17. The computer readable storage medium of claim 16, wherein the loading of the funds on the spending vehicle is not subject to a loan agreement pursuant to regulatory banking laws between the payee and the third-party payor.

18. The computer readable storage medium of claim 13, wherein the spending vehicle is a pre-paid credit card.

19. The computer readable storage medium of claim 13, wherein the spending vehicle is a debit card.

20. A method comprising the steps of:
receiving information indicative of a tax refund payment payable by a payor to a payee;
receiving information indicative of a selection by the payee to associate at least a portion of the tax refund payment with a pre-paid credit card or debit card;
receiving information indicative of an agreement from the payee to receive funds loaded on the pre-paid credit card or debit card in exchange for a third-party payor receiving the associated tax refund payment;
determining, via a computer, a load amount to be loaded on to the pre-paid card or debit card, with the load amount based on the portion of the tax refund payment assigned to the third-party payor; and
causing, via the computer, the pre-paid credit card or debit card to be loaded with the load amount.

* * * * *